United States Patent [19]

Mabusth

[11] Patent Number: 4,550,221

[45] Date of Patent: Oct. 29, 1985

[54] TOUCH SENSITIVE CONTROL DEVICE

[76] Inventor: Scott Mabusth, 740 N. Brown Rd., Long Lake, Minn. 55356

[21] Appl. No.: 539,810

[22] Filed: Oct. 7, 1983

[51] Int. Cl.[4] ............................................. G08C 21/00
[52] U.S. Cl. ...................................... 178/18; 340/706
[58] Field of Search ............................ 178/18, 19, 20; 340/706

[56]  References Cited

U.S. PATENT DOCUMENTS

| Re. 23,030 | 8/1948 | Holt | 35/1 |
|---|---|---|---|
| 3,256,386 | 6/1966 | Morchand | 178/5.6 |
| 3,263,126 | 11/1966 | Glenn | 200/16 |
| 3,292,489 | 12/1966 | Johnson et al. | 88/24 |
| 3,382,588 | 5/1968 | Serrell et al. | 35/9 |
| 3,482,241 | 11/1969 | Johnson | 340/337 |
| 3,492,440 | 1/1970 | Cerbone et al. | 179/90 |
| 3,497,966 | 3/1970 | Gaven | 35/9 |
| 3,516,176 | 6/1970 | Cleary et al. | 35/9 |
| 3,519,105 | 7/1970 | Geil | 187/29 |
| 3,522,664 | 8/1970 | Lambright et al. | 35/8 |
| 3,591,749 | 7/1971 | Comstock | 200/167 |
| 3,696,409 | 10/1972 | Braaten | 340/365 |
| 3,732,389 | 5/1973 | Kaelin et al. | 200/167 |
| 3,921,166 | 11/1975 | Volpe | 340/365 |
| 3,974,332 | 8/1976 | Abe et al. | 178/18 |
| 4,056,699 | 11/1977 | Jordan | 200/5 |
| 4,264,903 | 4/1981 | Bigelow | 340/365 |
| 4,281,323 | 7/1981 | Burnett et al. | 340/712 |
| 4,290,061 | 9/1981 | Serrano | 340/712 |
| 4,310,839 | 1/1982 | Schwerdt | 340/712 |
| 4,334,219 | 6/1982 | Paulus et al. | 340/712 |
| 4,455,452 | 6/1984 | Schuyler | 178/18 |

FOREIGN PATENT DOCUMENTS 1582941 2/1977 United Kingdom .

OTHER PUBLICATIONS

IBM Technical Disclosure Bulletin, "Generation of X and Y Coordinate Information, A. Bezgin, vol. 1, No. 6, pp. 13 and 14, Apr. 1959.
James K. Johnson, Datamation, "Touching Data".
"New Products, Continued . . . Pheripherals . . . Touch Sensor", Creative Computing, Jul. 1983.
Interaction Systems, Inc., "Digitized X-Y Touch Sensitive CRT Screens from Interaction Systems".
Interaction Systems, Inc., "OEM Touch-Sensitive Products".
InfoWorld, Paul Freiberger, "Pointing Devices for Personal Computers", pp. 25–29.

(List continued on next page.)

Primary Examiner—Stafford D. Schreyer
Attorney, Agent, or Firm—Kinney & Lange

[57]  ABSTRACT

A touch sensitive control device translates touch location into output signals. The device includes a substrate which supports first and second interleaved, closely spaced, nonoverlapping arrays of conductive plates. The plates are aligned in rows and columns so that edges of each plate of one array are proximate to but spaced from the edges of plates of the other array. The plates of each column of the first array are connected together and the plates of each row of the second array are connected together. An insulating layer overlies the first and second arrays so that when the outer surface of the insulating layer is touched, the capacitance of at least one of the columns of plates of the first array and the rows of plates of the second array underlying the insulating layer at the location being touched exhibits a change of capacitance with respect to ambient ground. The columns of the first array and the rows of the second array are periodically connected on a multiplexed basis to a capacitance measuring circuit. Based upon the measured capacitance of each column of the first array and row of the second array, the microcomputer produces output signals which represent the coordinates of the location being touched. These output signals can be used, for example, to control the position of a cursor on a display screen or to make selected function commands.

18 Claims, 7 Drawing Figures

OTHER PUBLICATIONS

Lisa B. Stahr, "Displaying the Future", *PC World*, vol. 1, No. 2, pp. 84-86.

Lisa B. Stahr, "To Build a Better Mouse", *PC World*, vol. 1, No. 2, pp. 57-62.

Paul Somerson, "The Tale of the Mouse", *PC Magazine*, Feb. 1983.

"What is a Mouse", *PC Magazine*, Mar. 1983.

Roy Folk, "VisiCorp's Windows on the World", *PC World*, pp. 40-49.

Brochure "OptoMouse The Optical Smart Mouse that Puts Superior Computer Control in the Palm of Your Hand", USI Computer Products.

Brochure, "Test Drive Our Mouse", Mouse Systems Corporation, 1983.

Brochure, "Optomouse 2000 Retail Price List", USI Computer Products.

TOUCH SENSITIVE CONTROL DEVICE

BACKGROUND OF THE INVENTION

1. Field of the Invention

The present invention relates to touch sensitive devices. In particular, the present invention relates to a device which responds to the touch of a finger tip to move a cursor, make function commands, or provide control signals to computers or other electrical equipment.

2. Description of the Prior Art

With the ever-increasing popularity of computers, there has been considerable effort expended in developing new devices for interaction between the operator and the computer. At the present time, most of the interaction between the operator and the computer is performed through a keyboard and a display screen.

Functions such as editing and menu selection normally utilize a cursor which appears on the screen and is controlled by an input device. In some computers, movement of the cursor is performed by a set of keys which control movement of the cursor in vertical and horizontal directions on the screen. The use of keys for cursor control, however, is relatively slow and inconvenient.

Joy sticks have also been used for cursor control in computers as well as video games. Joy sticks, however, require movable mechanical parts which tend to wear out with time.

Another form of cursor control which has found increasing popularity is the "mouse", which is a small hand-held device which is moved by hand over a surface and which, as a result of that movement, provides cursor control signals which cause movement of the cursor on the display screen. The mouse also normally contains one or more programmable buttons which allow the operator to select a particular function to be performed as a result of the cursor movement.

At the present time, there are two general types of "mouse" products commonly in use. The first is the mechanical mouse in which a ball or a pair of orthogonal wheels are turned as a result of movement of the mouse over a working surface. The revolutions of a shaft attached to either the wheels or the ball are counted to provide an indication of incremental horizontal and vertical movement. While a mechanical mouse offers relatively high speed and high accuracy cursor movement, it also suffers from a number of disadvantages. In particular, the mechanical mouse has moving mechanical parts which tend to break or wear out. In addition, there is a tendency for dust to be picked up and accumulate in the motion sensing mechanism, which can affect the accuracy of the commanded movements of the cursor and ultimately result in malfunction and failure of the mouse.

The second type of mouse is the optical mouse, which does not require moving mechanical parts. The optical mouse, however, requires a specially designed pad which is marked with a grid of dots or lines. As the optical mouse is moved over this grid, it optically senses the lines or dots of the grid to produce cursor command signals representing X and Y coordinates of the cursor on the display screen. Although there are no moving parts in the optical mouse, it still has drawbacks. First, the movement of the optical mouse over the pad surface can result in wear. In addition, like the mechanical mouse, the optical mouse requires a considerable amount of desk surface in order to operate.

Another type of cursor control device which has been proposed uses an array of membrane switches which respond to the pressure of a finger. This type of pressure sensitive touch control device, however, requires considerable pressure by the operator's finger in order to produce movement of the cursor on the screen, and therefore cannot reliably sense the light sweep of a finger across its surface. This effectively limits the speed of the device.

Other types of cursor control devices have also been used in the past. One of these devices is the touch screen. In this device, the operator's finger can command certain functions or cursor movement by touching selected areas of the screen. One advantageous form of touch screen is described in U.S. Pat. No. 3,636,409 by Norman J. Braaten. In this device, transparent conductive pads are deposited on the surface of the display screen. When a person touches one of the conductive pads, an increase in capacitance occurs which is sensed by the change in frequency of an oscillator circuit. The oscillations corresponding to the various pads are counted and compared to a threshold value to provide an indication of which, if any, of the pads has been touched.

While the touch screen has proved to be very effective in many applications, it too has some drawbacks. In particular, the touch screen requires that the operator lift his arm in order to touch the screen. This can result in fatigue if done for a long period of time. In addition, the touching of the screen with the operator's finger can result in the screen surface becoming smudged over a period of time.

There is a continuing need for improved cursor controllers which are relatively compact, accurate and easy to use.

SUMMARY OF THE INVENTION

The present invention is a touch sensitive device which translates a location which is touched by an operator's finger into output signals. The device of the present invention includes a substrate which supports first an second interleaved, closely spaced, nonoverlapping arrays of conductive plates and an insulating layer which overlies the first and second arrays. The plates of each array are aligned in a plurality of rows and a plurality of columns, so that the plates of each array have edges which are adjacent to, but spaced from edges of the other array. The plates of each column of the first array are connected together as are the plates of each row of the second array. When an operator touches the outer surface of the insulating layer, capacitance of at least one of the columns of plates of the first array and at least one of the rows of plates in the second array underlying the insulating layer at the location being touched exhibit a change of capacitance with respect to ambient ground. The device of the present invention converts this change in capacitance to output signals by measuring capacitance of each column of the first array and each row of the second array, and providing the output signals as a function of the rows and columns which exhibit a predetermined change in measured capacitance. These output signals preferably represent X and Y coordinates of a desired cursor position. By moving his finger, the operator can change the output signals to cause movement of the cursor.

In preferred embodiments of the present invention, each column of the first array also includes a plate having at least a portion which is not adjacent to a plate of the second array. These additional plates are used to provide function control output signals. When the operator touches an area of the insulating layer overlying one of the additional function control plates, a change of capacitance occurs at one or more of the columns, but no corresponding change in capacitance occurs at any of the rows of the second array. The function control output signals are provided based upon changes in capacitance of one or more of the columns without a corresponding change of capacitance of one of the rows.

DETAILED DESCRIPTION OF THE PREFERRED EMBODIMENTS

Figure 1:
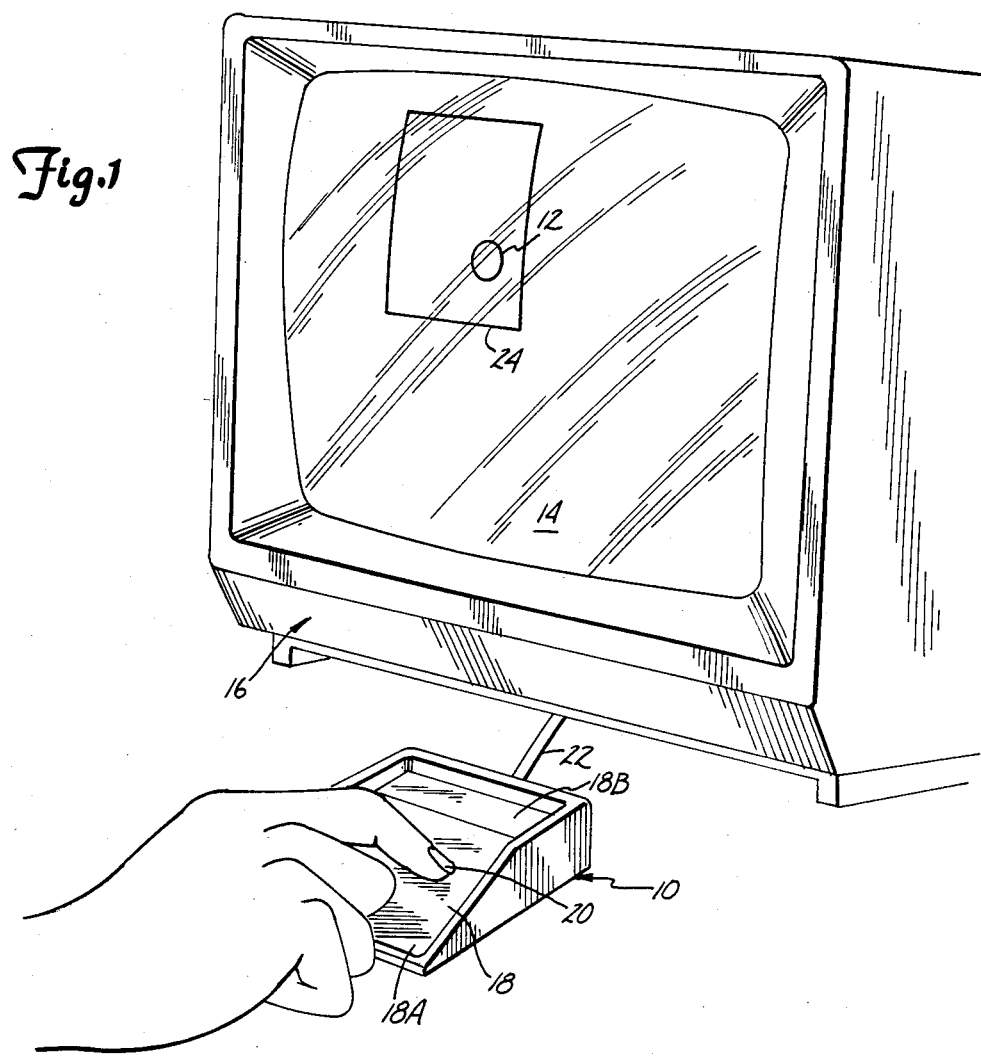
FIG. 1 is a perspective view showing the touch sensitive device of the present invention in use controlling the location of a cursor on a video display screen.

FIG. 1 shows the use of touch sensitive device 10 of the present invention in controlling the location of cursor 12 which appears on screen 14 of video display 16. As illustrated in FIG. 1, the position of cursor 12 on display screen 14 is controlled by an operator by touching cursor control touch pad 18 with finger 20. Touch sensitive device 10 senses the proximity of finger 20 and provides cursor control output signals through cable 22 to digital computer 23 (shown in FIG. 5) which in turn controls the operation of video display 16.

In the particular embodiment shown in FIG. 1, cursor 12 is in the form of a circle which appears on screen 14 within a region bounded by rectangle 24. In this example, rectangle 24 represents the area of screen 14 within which touch sensitive device 10 is currently controlling movement of cursor 12. As finger 20 is moved to one of the edges of touch pad 18, rectangle 24 shifts by half of its width to permit continued movement of cursor 12. By shifting of rectangle 24, touch sensitive device 10 can control the position of cursor 12 with high resolution throughout the entire area of screen 14.

Figure 2:
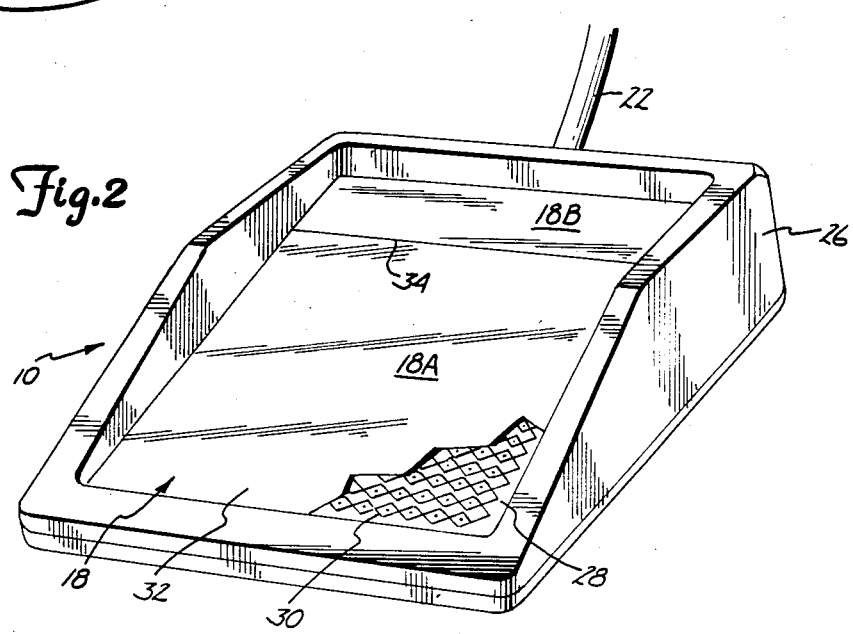
FIG. 2 is a perspective view (with portions broken away) of the touch sensitive device of the present invention.
Figure 4:
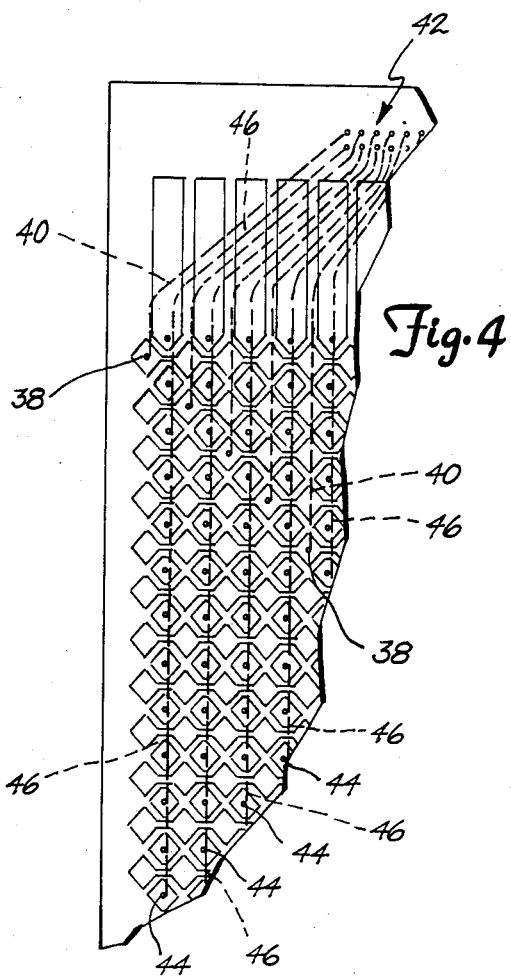
FIG. 4 is a partial top view showing the interconnection of the conductive plates in rows and columns.
Figure 5:
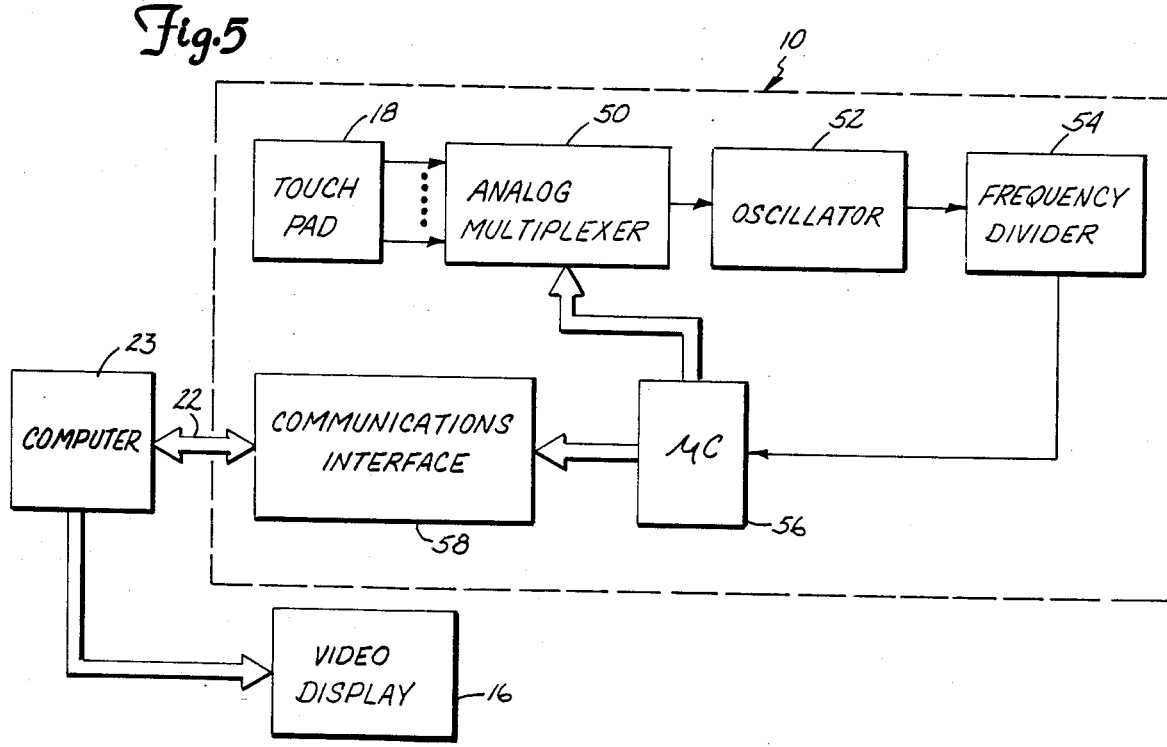
FIG. 5 is an electrical block diagram of a preferred embodiment of the present invention in which the touch sensitive device is used to provide cursor control and function control output signals to a computer.

As shown in further detail in FIG. 2, touch sensitive device 10 includes housing 26 which supports substrate 28 (and which encloses the electrical circuitry of device 10 shown in FIG. 5). On an upper surface of substrate 28 (which in this embodiment is a printed circuit board) are diamond shaped conductive plates 30. The arrangement of conductive plates 30 will be described in greater detail later with reference to FIGS. 3 and 4.

Conductive plates 30 are covered by a thin insulating layer 32 which is, for example, an epoxy coating, a plastic spray paint coating, or laminated Mylar. As shown in FIGS. 1 and 2, touch pad 18 is preferably divided in two regions: cursor control region 18A and funtion command region 18B. When touch sensitive device 10 senses the proximity of finger 20 in cursor control region 18A, the sensed location of finger 20 is converted to cursor position control signals (which represent X and Y cursor coordinates). When touch sensitive device 10 senses the proximity of finger 20 in function command region 18B, it produces and supplies a function command signal to digital computer 23 through cable 22.

In the embodiment shown in FIGS. 1 and 2, regions 18A and 18B are separated by boundary 34, which is preferably a raised line which is visible to the operator and which can be felt by the finger 20. This prevents the operator from inadvertently moving the finger 20 out of region 18A and into region 18B. In other embodiments of the present invention, the circuitry of touch sensitive device 10 will only accept the sensed proximity of a finger 20 in function command region 18B if that finger has first been lifted off of cursor control region 18A.

Figure 3:
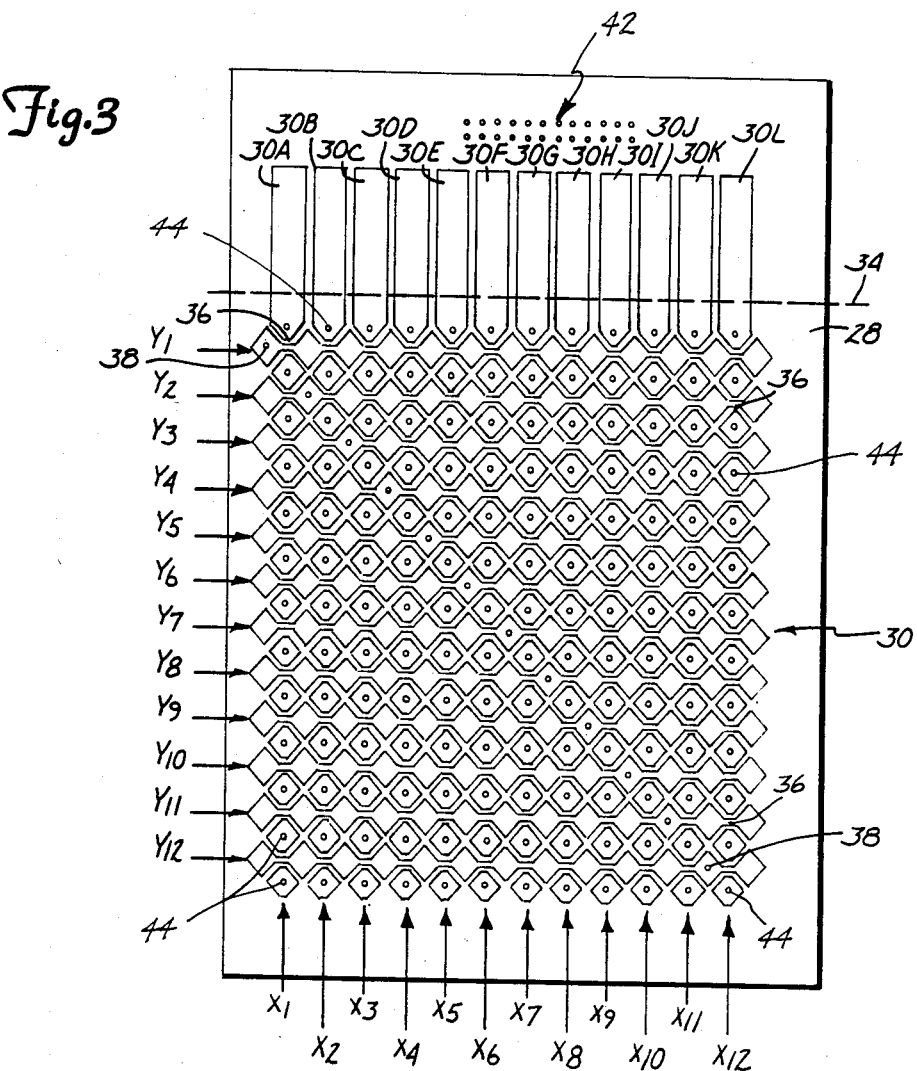
FIG. 3 is a top plan view showing the arrays of conductive plates used in the touch sensitive device of the present invention.

FIGS. 3 and 4 show substrate 28 and conductive plates 30 of touch pad 18 in further detail. In this embodiment, conductive plates 30 are thin electrically conductive metal plates which are deposited on the top surface of substrate 20. Plates 30 are arranged in a pair of interleaved, closely spaced, nonoverlapping arrays. In one preferred embodiment, plates 30 are formed of a metal such as copper which is deposited on substrate 20 and then chemically etched to form the desired pattern.

The plates of the first array are aligned in an array of thirteen columns and twelve rows. The individual plates of each row (Y1 through Y12) of the first array are interconnected so that, for example, thirteen plates form row Y1. The interconnection between adjacent plates of each row Y1-Y12 is provided by narrow conductive interconnect sections 36. One plate in each row Y1-Y12 contains a plated-through hole 38 which interconnects that row with a conductor 40 on the bottom surface of substrate 38 (as shown in FIG. 4). Conductors 40 interconnect each row Y1-Y12 with one of the conductive terminals 42 at the top edge of substrate 28.

The second array consists of plates arranged in thirteen rows and twelve columns. The plates of each column X1 through X12 are connected together by means of plated-through holes 44 and conductors 46 which are located on the bottom surface of substrate 28 (as shown in FIG. 4). Each conductor 46 is connected to one of the terminals 42 at the top edge of substrate 28.

As shown in FIG. 3, each of the plates 30 are in the form of a diamond, except for plates 30A-30L which form the uppermost plates of columns X1-X12. For reference, boundary 34 is shown in phantom in FIG. 3. The diamond-shaped plates 30 are located within cursor control region 18A, and are used in the production of cursor control signals representative of X and Y coordinates. Plates 30A-30L, on the other hand, are located in region 18B, and are used in the production of function command signals.

The plates 30 within cursor control region 18A are closely spaced and interleaved, so that each diamond shaped plate of rows Y1-Y12 has at least two edges (and in most cases four edges) which are adjacent to plates 30 of columns X1–X12. Similarly, each plate 30 of columns X1–X12 has at least two edges (and in most cases four edges) adjacent to plates 30 of rows Y1–Y12.

The size and spacing of plates 30 of rows Y1–Y12 and columns X1–X12 are selected so that a finger 20, when placed in contact with insulating layer 32, will overlap at least one plate of one of the rows Y1–Y12 and at least one plate of columns X1–X12. In one preferred embodiment, the plates 30 of cursor control region 18A are about one centimeter square in area each and are spaced apart by a distance of about 0.30 millimeter to about 0.38 millimeter. For the purposes of clarity, the spacing between plates 30 is exaggerated and not to scale in FIGS. 3 and 4, since the spacing would be too small to show clarity if the Figures were to scale.

The present invention senses the location of the finger 20 within cursor control region 18A or function command region 18B by sensing a change in capacitance between one or more of the plates 30 and ambient ground. When finger 20 is placed in contact with insulating layer 32 over a location within cursor control region 18A, the presence of the finger 20 adds capacitance between ambient ground and the plates of at least one of the rows Y1–Y12 and at least one of the columns X1–X12. The particular row or rows and the particular column or columns at which a change in capacitance occurs depends upon the location of finger 20 within cursor control region 18A. In other words, the present invention converts the location of finger 20 into X and Y coordinates by sensing a change of capacitance in at least one row Y1–Y12 an one column X1–X12. The present invention does not require pressure in order to make electrical contact (as in devices which use touch sensitive membrane switches), because the present invention senses changes in capacitance due to the proximity of finger 20 and plates 30. As a result, even a light sweep of finger 20 across cursor control region 18A produces changing X and Y coordinates.

When an operator's finger 20 touches function command region 18B, it overlies one or more of plates 30A–30L of columns X1–X12, respectively. This causes a change of capacitance of one or more of the columns X1–X12, but does not result in a corresponding change in capacitance of any of the rows Y1–Y12. When a change in capacitance is detected in one or more of the columns X1–X12 without a corresponding change in a row Y1–Y12, this indicates that finger 20 is in function command region 18B, and results in a funcion command signal being produced by touch sensitive device 10. This function command signal can, for example, be a command to execute a particular function designated by cursor 12 on screen 14.

In other preferred embodiments, the particular function command signal produced by touch sensitive device 10 depends upon the particular row or rows from among rows X1–X12 which exhibit a change in capacitance. In that way, the location of finger 20 within function command region 18B selects one of several possible functions. In some embodiments in which the particular function commands are known and fixed, outlines and legends are printed on the surface of insulating layer 32 to designate selected areas of region 18B as particular function command "keys".

FIG. 5 is an electrical block diagram of touch sensitive device 10 being used to supply cursor control and function command output signals to computer 23. In this embodiment, touch sensitive device 10 includes touch pad 18, analog multiplexer 50, oscillator 52, frequency divider 54, microcomputer 56 and communications interface 58.

Analog multiplexer 50 selects one of the rows Y1–Y12 or columns X1–X12 of capacitor plates to be connected to oscillator 52. In the embodiment shown in FIG. 5, analog multiplexer 50 (which preferably is formed by one or more CMOS analog multiplexers) is controlled by microcomputer 56 to sequentially connect each of the rows Y1–Y12 and columns X1–X12 to oscillator 52 for a predetermined time period.

Oscillator 52 preferably includes a voltage controlled oscillator which generates a squarewave output. The frequency of the output of oscillator 52 is a linear function of the capacitance of the particular row Y1–Y12 or column X1–X12 of the conductive plates connected to oscillator 52 by analog multiplexer 50. The output frequency of oscillator 52 is changed by the introduction of a small additional capacitance produced by the touching or proximity of a human finger to the insulator layer 32 overlying that particular row or column.

In the embodiment shown in FIG. 5, frequency divider 54 divides the output frequency of oscillator 52 to bring that frequency within the range which can be counted by the internal counter of microcomputer 56. By the number of oscillator pulses received during a fixed time period, an indication of frequency, and thus an indication of capacitance of the particular row or column connected to oscillator 52, is obtained. The use of frequency divider 54 permits use of lower cost microcomputer components since it reduces the frequency of the oscillator output. It can be seen, however, that the use of frequency divider 54 is not required in all cases, depending upon the particular microcomputer 56 which is used.

Microcomputer 56 is, in one preferred embodiment, an Intel 8048 or 8051 single-chip microcomputer which contains stored program memory, random access memory, general purpose input and output ports, arithmetic unit and instruction logic, and one or more internal counters and timers.

Microcomputer 56 causes analog multiplexer 50 to sequentially connect each of the rows Y1–Y12 an each of the columns X1–X12 to oscillator 52 for a predetermined time period. Microcomputer 56 then counts the number of oscillator pulses during each of the predetermined periods. During initial power-up procedures, and at other times when touch pad 18 is not being touched, microcomputer 56 uses the counts generated by each row and column to create a table of base line values. During subsequent operation, microcomputer 56 compares the count obtained for each row and for each column with the corresponding base line value for that row or column. If an area of insulating layer 32 overlying that column or row is being touched, the additional capacitance introduced by finger 20 causes a reduction in oscillator frequency, which results in a reduced count when that particular row or column is connected to oscillator 52. If the comparison of the oscillator frequency count to the base line value for the same row or column indicates the proximity of finger 20, microcomputer 56 determines the X or Y coordinate of finger 20 based upon the particular column(s) or row(s) which exhibits the changed frequency. Microcomputer 56 provides the X and Y coordinates to communications interface 58.

In a preferred embodiment of the present invention, microcomputer 56 has an internal resettable timer which is reset each time microcomputer 56 determines that a change of capacitance has occurred at one of the rows or columns of touch pad 18. If the timer reaches zero without having been reset, this indicates that touch pad 18 has not been touched by a finger within the timing period of the timer (which in one embodiment is thirty-two seconds). Microcomputer 56 then uses the frequency counts from the various rows and columns (which are either obtained during or immediately after the thirty-two second interval) to create a new table of base line values. By updating the table of base line values, microcomputer 56 provides automatic adjustment for environmental changes including internal component heat, external ambient temperature changes, changes in humidity, accumulations of dirt and grease on insulator layer 32, or environmental electrical noise.

Table I is a table describing, in further detail, one preferred embodiment of the operating program of microcomputer 56.

TABLE I

A. Start program
B. Initialize computer components and program variables (Note 1)
C. Read base line values into table for all touch coordinate lines (Note 2)
  1. While 32 second timer less than 32 seconds (Note 3)
    a. Scan all touch coordinates and save table addresses for X and Y coordinates whose difference from the base line frequency is greater than a preset threshold
      (1) Scan table for touch coincidences
        (a) Output codes for touch coincidences
        (b) Reset 32 second timer
      (2) Reset all touch table address variables
    b. Return to scan
  2. On a 32 second basis (untouched) determine base line accuracy and correct or modify
  3. Return for continuous operation Note 1
Read switch settings and establish communications mode, initalize multiplexer 50 to point to first touch row and column.
Note 2
The Base Line procedure establishes the value of the "free-run" frequencies by reading the untouched row and column frequencies and contructing a table of their digital values. This table is used during the scan process as the untouched valuefrom which the differences is calculated.
Note 3
A 32 second elapsed time function is incorporated for periodic adjustment in base line table value. This process automatically adjusts for environmental changes including internal component temperature, external ambient temperature changes, changes inhumidity, and pad contamination due to dirt and grease accumulation.

Communications interface 58 provides communications capability between microcomputer 56 and host computer 23. In one preferred embodiment of the present invention, communications interface 58 converts the output of microcomputer 56 which is in parallel form to standard serial data transmission format with a baud rate and voltage level compatible with the host computer.

Communication interface 58 preferably includes switches which allow the selection of serial data format, baud rate, and prefix and suffix code options to append the touch coordinate codes. Communications interface 58 also accepts serial data transmission from host computer 23 and retransmits the data on the output communication line of cable 26. This allows a transparent mode when incorporating touch sensitive device 10 on most industry standard computer terminals. In this configuration interface 58 inserts codes resulting from touch pad 18 having been touched into the normal communications stream from host computer 23. Host computer 23 differentiates these touch coordinate codes through the prefix code appended to the touch coordinate codes.

Figure 6:
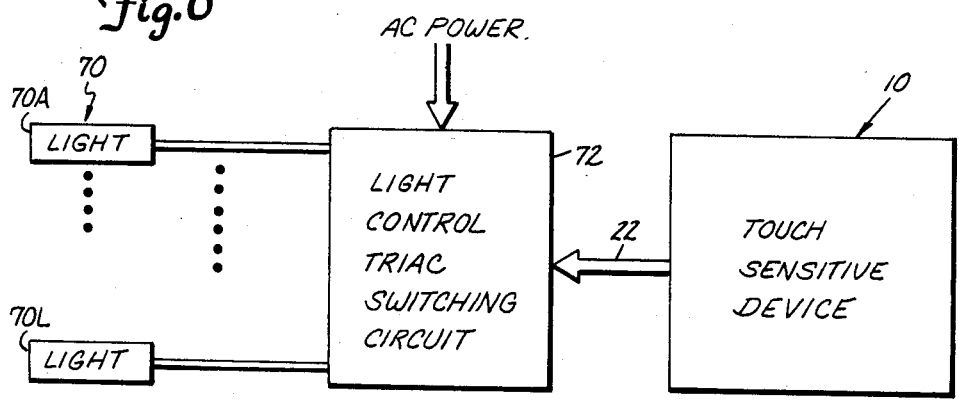
FIG. 6 is an electrical block diagram of another embodiment of the present invention in which the touch sensitive device is used to control the operation of an array of lights.

Touch sensitive device 10 of the present invention, while being particularly advantageous for providing cursor control and function command signals to a host digital computer, is equally applicable to other control functions. FIG. 6 illustrates an embodiment of the present invention in which touch sensitive device 10 is used to control the operation of an array of lights 70 through light control triacs switching circuit 72. Array 70 preferably includes twelve individual light units 70A–70L. The particular light or lights which are energized are selected based upon the particular column X1–X12 of touch pad 18 which are being touched by fingers of an operator. Touch sensitive device 10 provides control signals to light control triac switching circuit 72 to energize triacs corresponding to the particular columns X1–X12 which have been touched. When one of the triacs is turned on, it permits AC power to be supplied to the corresponding light 70A–70L.

In this embodiment of the present invention multiple lights can be controlled at the same time by using more than one finger to touch insulating layer 32 of touch pad 18. By rhythmically tapping fingers on insulating surface 32, the operator can control lights 70A–70L to flash in rhythm to music which is being played.

In a preferred embodiment of the present invention, the horizontal coordinates which are being touched control the lights which are energized, and the vertical coordinates (i.e. rows Y1–Y12 of touch pad 18) control the intensity of the lights which are turned on. In this embodiment, communications interface 58 (shown in FIG. 5) provides control signals to light control triac switching circuit 72 which control the firing of the triac to modulate the intensity of the light output based upon the Y coordinate of the uppermost finger.

In this preferred embodiment of the present invention, function control region 18B is preferably used to "lock on" selected lights of array 70. By touching function command region 18 over one of the plates 30A–30L, the operator selects a corresponding light 70A–70L which is to be turned on continuously.

Although the Figures illustrate particularly advantageous embodiments of the present invention, it will be understood that other embodiments of the present invention are also possible. For example, although an arrangement showing twelve rows (Y1–Y12) and twelve columns (X1–X12) has been described, it will be appreciated that greater or smaller numbers of rows and columns can be used in accordance with the present invention.

Figure 7:
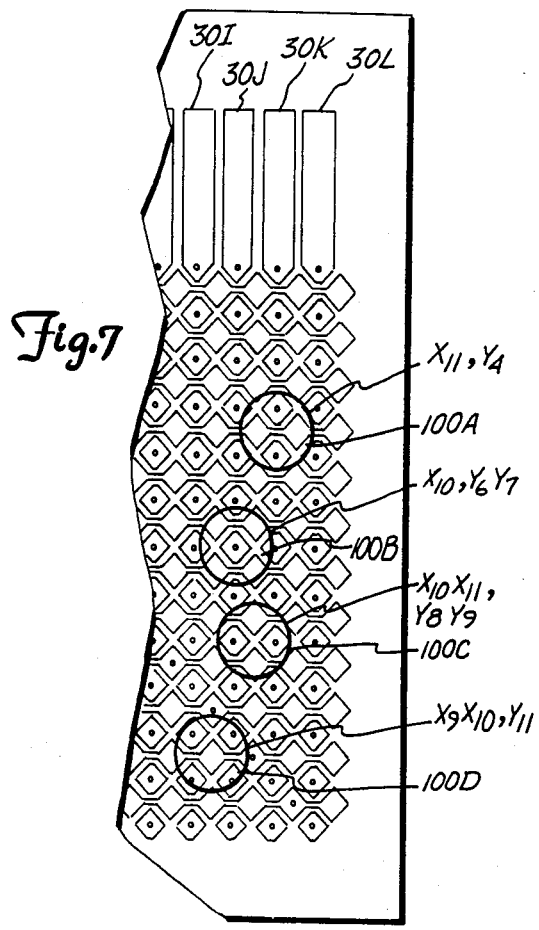
FIG. 7 is a top plan view of a portion of the arrays of rows and columns of plates of the touch sensitive device illustrating possible relative positions of a finger with respect to the rows and columns.

Even in those embodiments which use twelve rows (Y1–Y12) and twelve columns (X1–X12), the resolution of touch sensitive device 10 can in effect be the equivalent of a 23×23 array. FIG. 7 illustrates this unique feature of the present invention by showing a portion of touch pad 18 which includes columns X8 through X12 and rows Y1 through Y12. FIG. 7 shows four circles 100A, 100B, 100C and 100D which illustrate the four possible positions of the center of the tip of the finger with respect to the individual plates 30 forming rows Y1–Y12 and columns X1–X12.

As shown in FIG. 7, the length and width dimensions of each individual plate 30 are about half of the diameter of the area (represented by circles 100A–100D) which is covered when finger 20 touches insulating layer 32 of touch pad 18. In the first position illustrated by circle 100A, finger 20 is centered on a single column (XII) and a single row (Y4). Circle 100A overlies substantially all of two plates of column X11 and covers substantially all of two plates of row Y4. The coordinates of circle 100A are given, therefore, by a single column address (X11) and a single row address (Y4).

In the second position illustrated by circle 100B, finger 20 is centered on one column (X10) and between two rows (Y6 and Y7). Circle 100B covers all of one plate and parts of two other plates in column X10. It also covers a small portion of one plate in column X9 and a small portion of a plate in column X11. The amount of change in capacitance in column X10 is sufficient to be detected, but change in capacitance in columns X9 and X11 is not sufficient for detection. Circle 100B also covers most of two plates in row Y6 and most of two plates in row Y7. Both row Y6 and Y7 will exhibit a change in capacitance which is large enough to be detected. The coordinates of circle 100B, therefore, is given by a single X coordinate (X10) and by two Y coordinates (Y6 and Y7). This indicates that circle 100B is essentially centered on column X10 and on a line between columns Y6 and Y7.

Circle 100C illustrates the third position which is centered between two columns (X10 and X11) and between two rows (Y8 and Y9). One plate in each of columns X10 and X11 is almost entirely covered, and one plate in each of rows Y8 and Y9 is essentially covered by circle 100C. The change in capacitance is sufficiently large that both columns and both rows are detected as being touched. The coordinates of circle 100C, therefore, are defined by a pair of columns (X10 and X11) and a pair of rows (Y8 and Y9).

Circle 100D illustrates the fourth position in which circle 100D is centered between a pair of columns (X9 and X10) and is centered on one row (Y11). Sufficient changes in capacitance occur in both columns X9 and X10 to be detected, while only row Y11 exhibits a sufficient capacitive change to be detected. The coordinates of circle 100D, therefore, are defined by a pair of X coordinates (X9 and X10) and by a single Y coordinate (Y11).

In this embodiment of the present invention, microcomputer 56 searches for and stores columns and rows which exhibit sufficient capacitive change to be above the threshold value. If a pair of the stored rows or columns are adjacent to one another, microcomputer 56 determines that the position of finger 20 is centered between the two adjacent rows or columns, and provides an intermediate address. In effect, therefore, the position of finger 20 is defined by a total of twenty-three possible locations in both the X and Y dimensions. The effective resolution of touch sensitive device 10, therefore, is increased by a factor of four without any change in the pattern of plates 30.

Although touch pad 18 has been shown in FIGS. 1–4 as being formed on a flat printed circuit board substrate 28, the present invention is also applicable to substrates which have either convex or concave curvature in either the X or Y dimensions, or both.

In the embodiments illustrated in the Figures, all of the conductive plates 30 are coplanar (on the front surface of substrate 28). In other embodiments of the present invention, however, one array of plates (for example the plates forming rows Y1–Y12) are on a front surface, while the plates of the other array (for example the plates forming columns X1–X12) are located on a back surface of substrate 28. This arrangement is particularly advantageous if plated-through holes (like holes 38 and 44) are not possible. One such application is where touch pad 18 is in the form of a thin glass plate mounted on the front surface of a video display screen. In that case, substrate 28 is a very thin glass plate (having a thickness of on the order of about 1.25 mm to about 2.5 mm). In these embodiments, plates 30 are transparent conductive films, so that the screen of the display device can be viewed through substrate 28 and plates 30.

In those embodiments where the plates of rows Y1–Y12 and columns X1–X12 are not actually coplanar, substrate 28 must be very thin, so that the rows and columns are essentially coplanar. This is required so that the proximity of a finger contacting insulating layer 32 over the front surface of the touch pad 18 can be sensed by changes in capacitance of both the rows and columns of plates 30. In addition, conductive plates 30 must not overlap to create cross talk which would make detection of changes in capacitance due to the proximity of finger 20 difficult to detect.

In conclusion, the present invention is a device which provides high speed and high accuracy without the need for moving parts. The present invention is, in the preferred embodiments, small in size and does not require movement over a tabletop, so that the amount of table area required for use of the device is far less than the prior art "mouse" cursor controllers.

Although the present invention has been described with reference to preferred embodiments, workers skilled in the art will recognize that changes may be made in form and detail without departing from the spirit and scope of the invention.

What is claimed:

1. A touch sensitive device for translating touch location into output signals, the device comprising:

a substrate;

first and second interleaved, closely spaced, non-overlapping arrays of conductive plates supported by the substrate, the plates of each array having edges proximate to but spaced from the edges of plates of the other array, the plates of each array being aligned in a plurality of rows and a plurality of columns, the plates of each column of the first array being connected together and the plates of each row of the second array being connected together;

an insulating layer overlying the first and second arrays so that when an outer surface of the insulating layer is touched, capacitance of at least one of the columns of plates of the first array and the rows of plates of the second array underlying the insulating layer at a location being touched exhibits a change of capacitance with respect to ambient ground;

means for measuring capacitance of each column of the first array and each row of the second array; and means for providing the output signals as a function of the measured capacitances; wherein the output signals include coordinate output signals and function command output signals; and wherein the means for providing output signals provides coordinate output signals when a change in capacitance is measured at both a row and a column, and provides function command output signals when a change in capacitance is measured at a column without a corresponding change in capacitance being measured at a row.

2. The touch sensitive device of claim 1 wherein each column of the first array includes a plate having at least a portion which is not adjacent to a plate of the second array.

3. The touch sensitive device of claim 1 wherein the coordinate output signals represent X and Y coordinates of the location being touched based upon the row and the column at which the change in capacitance is measured.

4. The touch sensitive device of claim 1 wherein the function command output signals are a function of the column at which the change in capacitance is measured.

5. The touch sensitive device of claim 1 wherein the insulating layer has a coordinate control region overlying rows of plates of the second array and the columns of plates of the first array which are adjacent one another, and has a function command region overlying the portions of the plates of the columns of the first array which are not adjacent a plate of the second array.

6. The touch sensitive device of claim 1 wherein the means for measuring capacitance comprises:
   oscillator means for providing an oscillator signal having a frequency which is a function of capacitance of a row or column of plates connected to the oscillator means;
   multiplexer means for selectively connecting each row and column to the oscillator means for a predetermined time period;
   means for producing a capacitance value for each row and column which is a function of the frequency of the oscillator signal during the predetermined time period when that row or column is connected to the oscillator means;
   means for storing a base line value for each row and column which is representative of a capacitive value for that row or column during a base line period when the insulating layer is not being touched; and
   means for comparing the capacitance values with the corresponding base line values to produce an indication of each row and column at which a change in capacitance due to touching has occurred.

7. The touch sensitive device of claim 6 wherein the means for storing a base line value for each row and column updates the base line values each time a predetermined time interval occurs without a change in capacitance due to touching having occurred, the base line values being updated based upon capacitance values produced during the predetermined time interval.

8. The touch sensitive device of claim 6 wherein the means for providing output signals provides the output signals based upon the indication of each row and column at which a change in capacitance due to touching has occurred.

9. The touch sensitive device of claim 8 wherein the output signals represent coordinates of locations where touching has occurred.

10. The touch sensitive device of claim 9 wherein, based upon the indication of each row and column of which a change in capacitance due to touching has occurred, the means for providing output signals determines whether a change of capacitance at two adjacent rows has occurred and if so provides an output signal indicating a coordinate between the two adjacent rows, and determines whether a change of capacitance at two adjacent columns has occurred and if so provides an output signal indicating a coordinate between the two adjacent columns.

11. The touch sensitive device of claim 1 wherein the first and second arrays are supported on a common surface of the substrate.

12. The touch sensitive device of claim 1 wherein the plates of the first and second arrays are diamond shaped.

13. A touch sensitive device for translating touch location into output signals, the device comprising:
   a substrate;
   a plurality of conductive plates supported by the substrate and arranged and connected in a plurality of rows and a plurality of columns;
   an insulating layer overlying the plates so that when an outer surface of the insulating layer is touched, capacitance of at least one of the columns and rows of plates underlying the insulating layer at a location being touched exhibits a change of capacitance with respect to ambient ground;
   oscillator means for providing an oscillator signal having a frequency which is a function of capacitance of a row or column of plates connected to the oscillator means;
   multiplexer means for selectively connecting each row and column to the oscillator means for a predetermined time period;
   means for producing a capacitance value for each row and column which is a function of the frequency of the oscillator signal during the predetermined time period when that row or column is connected to the oscillator means;
   means for storing a base line value for each row and column which is representative of a capacitance value for that row or column during a base line period when the insulating layer is not being touched;
   means for updating the base line values each time a predetermined time interval occurs without a change in capacitance due to touching having occurred;
   means for comparing the capacitance values with the corresponding base line values to produce an indication of each row and column at which a change in capacitance due to touching has occurred; and
   means for providing the output signals based upon the indication of each row and column at which a change in capacitance due to touching has occurred.

14. The touch sensitive device of claim 13 wherein the output signals represent coordinates of locations where touching has occurred.

15. The touch sensitive device of claim 14 wherein, based upon the indication of each row and column at which a change in capacitance due to touching has occurred, the means for providing output signals determines whether a change of capacitance at two adjacent columns has occurred and if so provides an output signal indicating a coordinate between the two adjacent columns, and determines whether a change of capacitance at two adjacent rows has occurred and if so provides an output signal indicating a coordinate between the two adjacent rows.

16. A touch sensitive device for translating touch location into output signals, the device comprising:
   a substrate;

a plurality of touch-responsive capacitive sensors supported by the substrate, the sensors exhibiting a change in capacitance when touched;

oscillator means for providing an oscillator signal having a frequency which is a function of capacitance of a sensor connected to the oscillator means;

multiplexer means for selectively connecting each of the sensors to the oscillator means for a predetermined time period;

means for producing a capacitance value for each sensor which is a function of the frequency of the oscillator signal during the predetermined time period when that sensor is connected to the oscillator means;

means for storing a base line value for each sensor which is representative of a capacitance value for that sensor during a base line period when the sensor is not being touched;

means for updating the base line values each time a predetermined time interval occurs without a change in capacitance due to touching having occurred;

means for comparing the capacitance values with the corresponding base line values to produce an indication of each sensor at which a change in capacitance due to touching has occurred; and means for providing the output signals based upon the indication of each sensor at which a change in capacitance due to touching has occurred.

17. The touch sensitive device of claim 16 wherein the sensors are arranged in rows and columns and the output signals represent coordinates of locations where touching has occurred.

18. The touch sensitive device of claim 17 wherein, based upon the indication of each row and column at which a change in capacitance due to touching has occurred, the means for providing output signals determines whether a change of capacitance at two adjacent columns has occurred and if so provides an output signal indicating a coordinate between the two adjacent columns, and determines whether a change of capacitance at two adjacent rows has occurred and if so provides an output signal indicating a coordinate between the two adjacent rows.

* * * * *